June 29, 1926.
J. V. EMMONS
METHOD OF MAKING REAMERS
Filed June 25, 1925
1,590,184
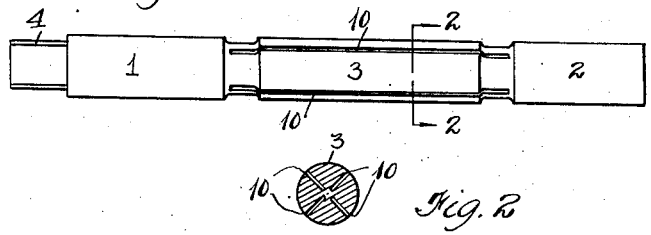
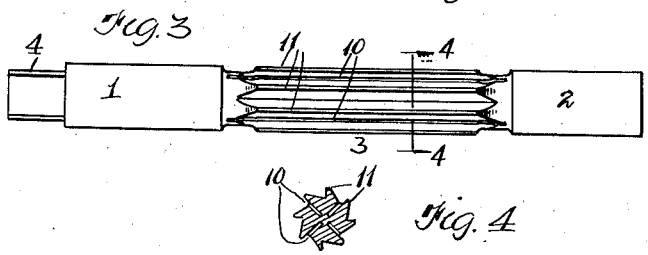
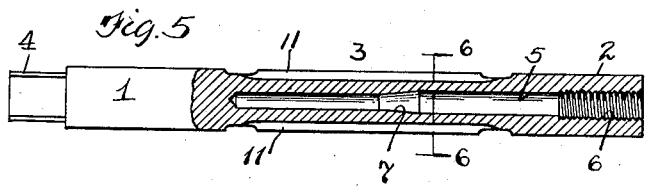
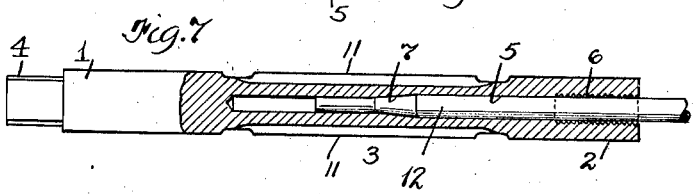
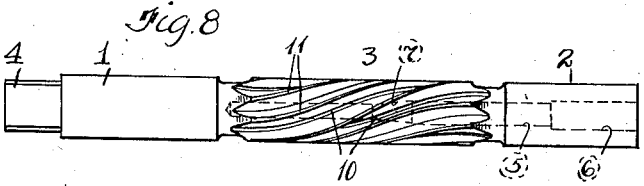
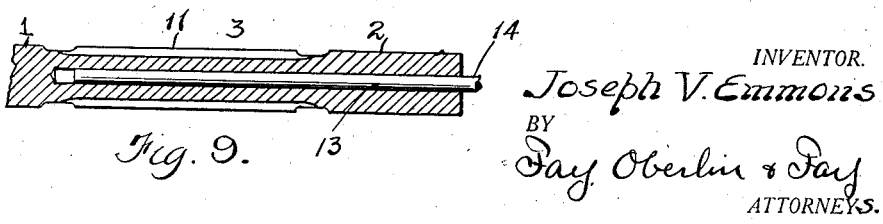
INVENTOR.
Joseph V. Emmons
BY
Fay Oberlin & Fay
ATTORNEYS.

Patented June 29, 1926.

1,590,184

UNITED STATES PATENT OFFICE.

JOSEPH V. EMMONS, OF SHAKER HEIGHTS, OHIO, ASSIGNOR TO THE CLEVELAND TWIST DRILL COMPANY, OF CLEVELAND, OHIO, A CORPORATION OF OHIO.

METHOD OF MAKING REAMERS.

Application filed June 25, 1925. Serial No. 39,531.

The present improvements relate more particularly to a method for manufacturing spiral flute expansion reamers which differ from the ordinary spiral flute or helical reamer in that the body of the tool, instead of being solid, is bored out and slits cut in the spiral flutes so as to permit of the expansion of the blades by forcing a pointed or tapered pin within the bore of the tool. More or less difficulty has been encountered in the manufacture of this type of reamer due to the fact that the necessary slots between the blades can not be readily cut to the required depth on a helix or spire inasmuch as a saw is conveniently employed for this operation and if the twist of the helix be too great, such saw will either bind or break.

The object of the present invention accordingly is to provide a method wherein the slots, as well as the flutes, may be cut straight and the necessary inclination or curvature thereafter imparted thereto by appropriately twisting the body of the reamer. A further object is to prevent the partial closure of the slots and the tendency of the blades to become distorted during such twisting operation.

To the accomplishment of the foregoing and related ends, said invention, then, consists of the steps hereinafter fully described and particularly pointed out in the claims, the annexed drawing and the following description setting forth in detail certain mechanism embodying the invention, such disclosed means constituting, however, but one of various mechanical forms in which the principle of the invention may be used.

In said annexed drawing:—

Fig. 1 is a side elevation of a blank or piece of stock such as is employed in making a reamer according to the present improved method, the body of such blank being shown with the above mentioned slots already cut therein; Fig. 2 is a transverse section of the reamer thus slotted, the plane of the section being indicated by the line 2—2, Fig. 1; Fig. 3 is a similar side elevation of the reamer after the body has been provided with the necessary flutes; Fig. 4 is a transverse section of the same, the plane of the section being indicated by the line 4—4, Fig. 3; Fig. 5 is partly a side elevation and partly an axial section of the reamer after it has been thus slotted and fluted, such section also showing the central opening or bore with which the reamer is provided; Fig. 6 is a transverse section of the same, the plane of the section being indicated by the line 6—6, Fig. 5; Fig. 7 is a view similar to that of Fig. 5, but showing a mandrel inserted in the bore preparatory to the twisting operation; Fig. 8 is a side elevation of the finished reamer; and Fig. 9 is a section showing a modification.

As illustrated in Fig. 8, which shows the finished article, the latter comprises two end portions 1 and 2 and an intermediate, spirally fluted body portion 3. One such end portion is left solid and is provided with a squared projection or tang 4 whereby the reamer may be secured in a suitable chuck. Extending from the other end 2, through the body 3 of the reamer, is a central bore 5, which is shown only in dotted outline in the elevational view of Fig. 8.

Referring particularly to such last mentioned figure, the outer portion 6 of the bore is internally threaded and its diameter is reduced at an intermediate point 7 so that by means of a pin (not shown), provided with external threads to engage such threads 6 and with a pointed or tapered end to engage such reduced portion 7 of the bore, the body of the reamer may be expanded as required in use.

The first step in the manufacture of the reamer starting with a blank as shown in Fig. 1, except for the slots in the body portion of such blank, is to cut the desired number of such slots 10, four being illustrated in the case in hand, (see Fig. 2). These slots, as previously stated, are cut with a saw, and since they are straight and lie longitudinally of the reamer body they may be very quickly and easily made. It should be stated at this point that while the bore 5 is preferably formed at a later stage in the operation it may, if desired, be formed previously to the aforesaid slotting step, in which event the slots 10 may be cut through into such bore, or they may be cut to a corresponding depth if the blank is left solid, or they may be cut through until they meet in the case of such solid blank.

Following the cutting of the slots 10 in the manner just described, the blades 11 are formed by milling a flute or channel on one side of each of such slot, and inasmuch as there will ordinarily be more flutes than slots, such additional flutes as may be desired will be milled between each pair of adjacent slots. Such flutes, it will be understood, are milled straight and this milling operation may accordingly be quickly and easily accomplished.

Where the bore 5 has not been previously formed such bore will now be drilled as the third step in the manufacture of the reamer, and this is the preferred order of procedure.

The remaining step in such manufacture, so far as the present invention is concerned, is the twisting of the reamer body to impart the desired spiral angle to the blades and flutes or, in other words, to cause them to conform to the curve about such body which they should follow in the finished article. The reamer, or at least the body portion thereof, is preferably although not necessarily heated preliminarily to such twisting operation and, if desired, temporary filler strips corresponding to the metal removed by the saw may be inserted in the slots in order to prevent them from becoming closed incidentally to the twisting operation. The latter may be conveniently performed by gripping the respective ends 1 and 2 between jaw members capable of relative rotative movement.

The use of filler strips in the manner just referred to is not presented as new in the present connection. Furthermore, it has been found in practice that such strips are unsatisfactory, at least by themselves, to accomplish the object desired, which is to prevent distortion of the blades due to the tendency of the portions of the body that lie between the slots to contact into the bore incidentally to the twisting operation. Accordingly, in order effectively to overcome this tendency I employ the mandrel 12, as shown in Fig. 7. This mandrel consists of a pin or rod that is turned to have the same external conformation as the interior of the bore 5, although it is not necessary that the extremity of the rod project entirely to the end of inner portion of the bore of smaller diameter. In other words, such mandrel may terminate short of such bore-end as shown. This mandrel may be externally supported in any suitable manner so as to be held against endwise movement, while the ends of the reamer are rotated relatively to each other in the manner just described. As a result the portions of the reamer body intermediate of the slots 10 will be supported just as effectively as if the bore had not been previously formed, and the tendency for the body and the blades to become distorted is substantially entirely eliminated.

After the twisting operation the mandrel is of course removed, the filler strips, if these have been used, likewise removed, and the body of the tool hardened in the usual manner. The finished tool will then present the appearance illustrate in Fig. 8.

As an alternative to thus inserting the mandrel 12 in the bore of the tool and there holding the same during the twisting operation, the body of the reamer may be twisted without the mandrel and the latter thereupon inserted and the reamer body expanded so as again to open the slots in case they have become closed or partially closed in the twisting process. This will preferably be done while the metal is still hot so that the parts of the body affected may be readily displaced to occupy their original proper positions.

While in Fig. 7, the mandrel 13 is shown as inserted in bore 5 in its final form comprising two sections, one of larger diameter than the other, it may be found desirable to leave such bore of single, i. e. smaller, diameter until after the twisting step. In other words, the body wall adjacent the portion of the bore of larger diameter, as will appear from an inspection of Fig. 7, is considerably thinner than the body wall adjacent the smaller bore diameter, and there will be a corresponding tendency for the first mentioned portion of the body to twist more than the other. Accordingly, as shown in Fig. 9, the bore 13 may be left throughout of initial smaller diameter and a mandrel 14 of corresponding diameter employed in such twisting step, so as to insure a uniform effect throughout the length of the mandrel body. Such bore 13 will then be subsequently enlarged at its outer end, reamed to provide the bevel portion, and threaded at its outer end, exactly as shown in Fig. 6.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. In a method of making a spiral flute expansion reamer, the steps which consist in providing a central bore and longitudinally extending slots and flutes in the reamer body, the requisite operations being performed in any desired order, and then twisting said body to impart the desired spiral angle to such slots and flutes, a mandrel being inserted in such bore as and for the purpose described.

2. In a method of making a spiral flute expansion reamer, the steps which consist in providing a central bore and longitudinally extending slots and flutes in the reamer body, the requisite operations being performed in any desired order, inserting a mandrel in such bore, and then twisting said body to impart the desired spiral angle to such slots and flutes.

Signed by me, this 23 day of June, 1925.

JOSEPH V. EMMONS.